(12) United States Patent
Xiu et al.

(10) Patent No.: US 11,942,644 B2
(45) Date of Patent: Mar. 26, 2024

(54) PREPARATION METHOD OF ANODE SLURRY AND BATTERY

(71) Applicants: CALB Technology Co., Ltd., Jiangsu (CN); CALB Co., Ltd., Jiangsu (CN)

(72) Inventors: Zhongxun Xiu, Changzhou (CN); Taotao Shen, Changzhou (CN); Junli Tong, Luoyang (CN)

(73) Assignees: CALB Technology Co., Ltd., Jiangsu (CN); CALB Co., Ltd., Jiangsu (CN)

( * ) Notice: Subject to any disclaimer, the term of this patent is extended or adjusted under 35 U.S.C. 154(b) by 195 days.

(21) Appl. No.: 17/382,347

(22) Filed: Jul. 22, 2021

(65) Prior Publication Data

US 2022/0384814 A1  Dec. 1, 2022

(30) Foreign Application Priority Data

May 25, 2021  (CN) .......................... 202110570443.4

(51) Int. Cl.
*H01M 4/62* (2006.01)
*H01M 4/02* (2006.01)
*H01M 4/587* (2010.01)

(52) U.S. Cl.
CPC ........... *H01M 4/622* (2013.01); *H01M 4/587* (2013.01); *H01M 4/624* (2013.01); *H01M 2004/027* (2013.01)

(58) Field of Classification Search
CPC ...... H01M 4/622; H01M 4/587; H01M 4/624; H01M 2004/027; H01M 4/133; H01M 4/134; H01M 4/1393; H01M 4/1395; H01M 10/0525; H01M 4/0404; H01M 4/62; H01M 4/04; Y02E 60/10

See application file for complete search history.

(56) References Cited

U.S. PATENT DOCUMENTS

| | | | | |
|---|---|---|---|---|
| 2013/0209861 | A1* | 8/2013 | Yong | H01M 50/491 429/144 |
| 2016/0365559 | A1* | 12/2016 | Yoshimaru | H01M 50/417 |
| 2016/0372728 | A1* | 12/2016 | Yoshimaru | H01M 50/429 |

(Continued)

FOREIGN PATENT DOCUMENTS

| | | |
|---|---|---|
| CN | 105406073 | 3/2016 |
| CN | 107834023 | 3/2018 |
| CN | 108110209 | 6/2018 |

(Continued)

OTHER PUBLICATIONS

"Office Action of China Counterpart Application", dated Feb. 17, 2022, with English translation thereof, pp. 1-11.

(Continued)

*Primary Examiner* — Andrew J. Oyer
(74) *Attorney, Agent, or Firm* — JCIP GLOBAL INC.

(57) ABSTRACT

A preparation method of a cathode slurry and a battery are provided. The preparation method includes: S1, mixing materials containing a plasticizer and an additive to form a premixed slurry A; and S2, mixing a styrene-butadiene rubber emulsion with the premixed slurry A. The plasticizer includes a first functional group including at least one of a hydroxyl group, a carbonate group, and a ketone group. The additive includes a second functional group including at least one of a carboxyl group, a nitrile group, and an amide group.

5 Claims, 2 Drawing Sheets hydrogen bond

(56) References Cited

U.S. PATENT DOCUMENTS

2017/0155151 A1* 6/2017 Bae ..................... H01M 4/622

FOREIGN PATENT DOCUMENTS

| CN | 111509231 | 8/2020 |
| CN | 111933905 | 11/2020 |
| CN | 112382757 | 2/2021 |
| EP | 3573150 | 11/2019 |

OTHER PUBLICATIONS

"Search Report of Europe Counterpart Application", dated Jan. 31, 2022, pp. 1-8.

* cited by examiner hydrogen bond electrostatic interaction

PREPARATION METHOD OF ANODE SLURRY AND BATTERY

CROSS-REFERENCE TO RELATED APPLICATION

This application claims the priority of China patent application ser. no. 202110570443.4, filed on May 25, 2021. The entirety of the above-mentioned patent application is hereby incorporated by reference herein and made a part of this specification.

BACKGROUND

Technical Field

The disclosure relates to a technical field of batteries, and in particular, relates to a preparation method of an anode slurry and a battery.

Description of Related Art

When a slurry is to be coated on an electrode plate, a plasticizer is often added as an effective way to improve cracking. When a plasticizer (e.g., ethylene carbonate (EC), propylene carbonate (PC), 1,3-butanediol, nitrogen methyl pyrrolidone (NMP), and other small molecule solvents) is added to a battery slurry, the plasticizer enters the molecular chains of the adhesive polymer. In this way, the intermolecular stress among the polymer molecules is reduced, the crystallinity of the molecular chains of the polymer is reduced, the plasticity of the polymer is improved, and the flexibility of the electrode plate of the battery is enhanced. Moreover, cracking of an electrode plate when being coated with a slurry is improved, and the processing performance of the slurry is enhanced, so this method is suitable for the faster coating process.

In the industry, during the slurry mixing process of an anode slurry containing a styrene-butadiene rubber (SBR) emulsion adhesive, the step of adding a plasticizer is usually performed after the SBR emulsion is added, or the plasticizer and the SBR emulsion are added together for stirring. In other words, no attention is given to the influence of the addition step of the plasticizer and the SBR emulsion on the slurry properties. This process makes it easy to generate a molecular dipole force between the polar plasticizer and the sodium alkyl sulfonate in the SBR emulsion. As a result, demulsification may occur in the SBR emulsion, the SBR structure may be destroyed, and battery performance may be deteriorated.

SUMMARY

In order to overcome the foregoing defects, the disclosure provides a preparation method of an anode slurry and an anode plate and a battery formed by the anode slurry prepared through the preparation method.

An embodiment of the disclosure provides a preparation method of an anode slurry, and the preparation method includes the following steps. In step S1, materials containing a plasticizer and an additive are mixed to form a premixed slurry A. In step S2, a styrene-butadiene rubber (SBR) emulsion is mixed with the premixed slurry A. The plasticizer includes a first functional group, and the first functional group includes at least one of a hydroxyl group, a carbonate group, and a ketone group. The additive includes a second functional group, and the second functional group includes at least one of a carboxyl group, a nitrile group, and an amide group.

An embodiment of the disclosure further provides a battery, and the battery includes an anode plate formed by the anode slurry prepared through the preparation method.

DESCRIPTION OF THE EMBODIMENTS

Figure 1:
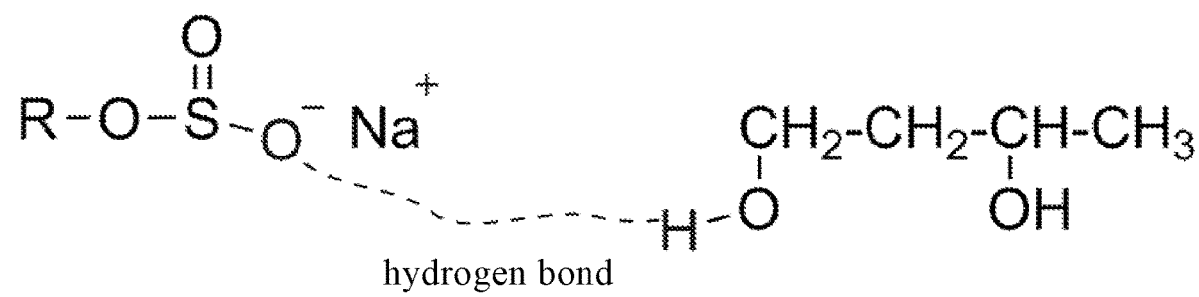
FIG. 1 is a schematic diagram of formation of a force between a plasticizer containing a hydroxyl group and a surfactant in a styrene-butadiene rubber (SBR) emulsion.

The disclosure is further described in detail in combination with specific embodiments.

In the specification, the reference numerals S1, S2, S11, S12, and S13 of the steps described herein are provided for the convenience of distinguishing different steps, and are not intended to limit the order and continuity of the steps. That is, other auxiliary steps and the like may be included between any of these steps.

In the disclosure, a preparation method of a cathode slurry includes S1, mixing materials containing a plasticizer and an additive to form a premixed slurry A, and S2, mixing a styrene-butadiene rubber (SBR) emulsion with the premixed slurry A. The plasticizer includes a first functional group, and the first functional group includes at least one of a hydroxyl group, a carbonate group, and a ketone group. The additive includes a second functional group, and the second functional group includes at least one of a carboxyl group, a nitrile group, and an amide group. In the disclosure, the plasticizer is mixed with the additive first and is mixed with the SBR emulsion later. An intermolecular dipole force is formed between the plasticizer and the additive in advance in the mixing stage of the plasticizer and the additive before the plasticizer is mixed with the SBR emulsion. In this way, an intermolecular force, which may lead to SBR demulsification, is prevented from being formed between plasticizer molecules and sodium alkyl sulfonate of a surfactant in the SBR emulsion. The structural stability of the SBR emulsion may thus be kept, the slurry performance may be stably maintained, and the cycle performance of the battery may be improved.

Figure 2:
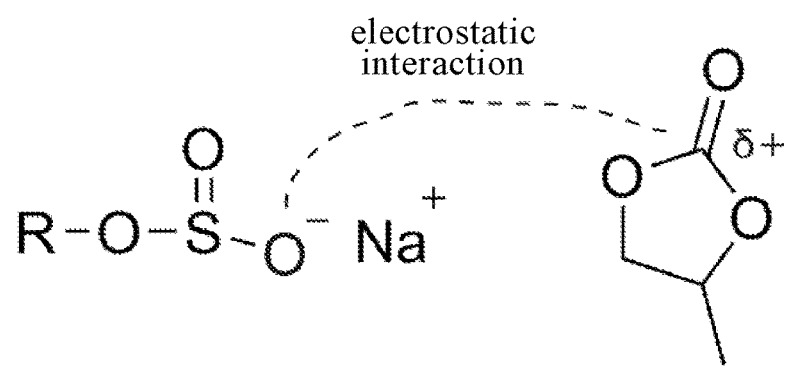
FIG. 2 is a schematic diagram of formation of a force between a plasticizer containing a carbonate group and a surfactant in an SBR emulsion.
Figure 3:
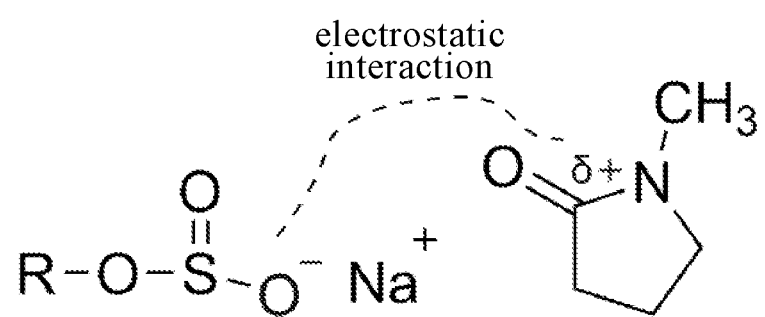
FIG. 3 is a schematic diagram of formation of a force between a plasticizer containing a ketone group and a surfactant in an SBR emulsion.

FIG. 1 illustrates a schematic diagram of formation of a dipole force between a plasticizer containing a hydroxyl group and sodium alkyl sulfonate of a surfactant in an SBR emulsion. In this figure, 1,3-butanediol is treated as an example to explain how the dipole force is formed between the plasticizer and the surfactant. As shown in FIG. 1, the hydroxyl group of 1,3-butanediol may easily form a hydrogen bond with the sulfonic acid group, and the stability of the SBR emulsion may thereby be destroyed and the demulsification is generated. FIG. 2 illustrates a schematic diagram of formation of a dipole force between a plasticizer containing a carbonate group and sodium alkyl sulfonate of a surfactant in an SBR emulsion. In this figure, PC is treated as an example to explain how the dipole force is formed between the plasticizer and the surfactant. It can be seen from FIG. 2 that an electrostatic force may be easily formed between the carbonate group in the plasticizer and the sulfonic acid group, and the stability of the SBR emulsion may thus be destroyed and the demulsification is generated. FIG. 3 illustrates a schematic diagram of formation of a dipole force between a plasticizer containing a ketone group and sodium alkyl sulfonate of a surfactant in an SBR emulsion. In this figure, NMP is treated as an example to explain how the dipole force is formed between the plasticizer and the surfactant. It can be seen from FIG. 3 that an electrostatic force may be easily formed between the ketone group in the plasticizer and the sulfonic acid group, and the stability of the SBR emulsion may thus be destroyed and the demulsification is generated.

In the disclosure, an additive and a plasticizer with specific functional groups are mixed with each other first, so that a dipole force is formed in advance between the plasticizer and the additive. As such, when an SBR emulsion is then added to be mixed, an intermolecular force, which may lead to SBR demulsification, is prevented from being formed between plasticizer molecules and sodium alkyl sulfonate in the surfactant in the SBR emulsion. In this way, the structural stability of SBR may be kept, the slurry performance may be stably maintained, and the cycle performance of the battery may be improved.

In the disclosure, the additive may be any additive that is suitable for use in a battery, does not react with materials in the battery, and does not cause side reactions at a working voltage of the battery. The additive may be a binder, flame retardant, film-forming agent, etc., and the additive may also be any suitable additive that does not participate in the battery reaction but only interacts with the plasticizer. In some optional embodiments, the additive may be selected from one or more of sodium carboxymethyl cellulose (CMC), polyacrylic acid (PAA), polyimide (PI), polyamide (PA), polyetherimide (PEI), and polyacrylonitrile (PAN).

In some optional embodiments, the plasticizer may be any suitable plasticizer having at least one functional group of a hydroxyl group, a carbonate group, and a ketone group, for example but not limited to, one or more of 1,3-butanediol, dodecyl alcohol ester, triethyl citrate (TEC), tributyl citrate (TBC), dimethyl phthalate (DMP), dibutyl phthalate (DBP), glycerol triacetate (GTA), ethylene carbonate (EC), and propylene carbonate (PC).

From the above principle, it can be seen that when a force is formed between all the functional groups in the plasticizer and the functional groups of the additive, the force applied on the SBR emulsion is the least. Therefore, it is preferable that a mole ratio of the first functional group in the plasticizer to the second functional group in the additive is not greater than 1. This embodiment is only a preferred solution, and is not intended to limit the disclosure. A person having ordinary skill in the art should understand that as long as the additive and the plasticizer containing specific functional groups are premixed with each other, the demulsification force of the plasticizer applied on the SBR emulsion may be reduced, and the purpose of the disclosure may be accordingly achieved.

In some embodiments, the following two methods may be implemented to mix the plasticizer and the additive in advance. In method one, the step of S1 includes S11, mixing materials including an anode active material, a conductive agent, the additive, the plasticizer, and a solvent to form the premixed slurry A. In method two, the step of S1 includes S12, mixing materials containing the plasticizer, the additive, and a solvent to form a premixed slurry B, and S13, mixing materials containing the premixed slurry B, an anode active material, and a conductive agent to form the premixed slurry A. Both of the above methods may be implemented to allow a force to be formed between the plasticizer and the additive, so as to reduce a force between the plasticizer and the surfactant in the SBR emulsion, inhibit the demulsification of the SBR, and improve the cycle performance of the battery.

The preparation method of an anode slurry provided by the disclosure is suitable for the preparation of any anode slurry using an SBR emulsion and a plasticizer containing a hydroxyl group, a carbonate group, and a ketone group. Therefore, the method provided by the disclosure is suitable for any slurry formed from an anode active material. For a lithium ion battery, the anode active material provided by the disclosure may be, but not limited to, one or more of natural graphite, artificial graphite, silicon carbon, silicon oxide, and lithium titanate.

In the disclosure, the plasticizer is mixed with the additive first and is mixed with the SBR emulsion later. An intermolecular dipole force is formed between the plasticizer and the additive in advance in the mixing stage of the plasticizer and the additive before the plasticizer is mixed with the SBR emulsion. In this way, an intermolecular force, which may lead to SBR demulsification, is prevented from being formed between plasticizer molecules and sodium alkyl sulfonate of a surfactant in the SBR emulsion. Therefore, the structural stability of the SBR emulsion may be kept, the slurry performance may be stably maintained, and the cycle performance of the battery may be improved.

The disclosure further provides a battery including an anode plate prepared through the foregoing method.

Specific examples are provided below to illustrate the disclosure in detail. Nevertheless, these examples are exemplary only and do not intend to limit the protection scope of the disclosure.

In the following examples and comparative examples, the reagents, materials, and instruments used may all be commercially available unless otherwise specified. SBR emulsions are all commercially available products of Zeon Corporation with model number 104A. The solid content of the SBR emulsions is 45%, and amounts of the SBR emulsions used in the following examples are calculated based on the mass of the added emulsions.

The percentages in the examples are mass percentages.

EXAMPLE 1

Preparation of Anode Plate

Anode materials included graphite, a conductive agent (SP), CMC, an SBR emulsion, and 1,3-butanediol, and the materials were prepared according to graphite: SP: CMC: SBR emulsion: 1,3-butanediol (plasticizer)=95.1:0.8:1.7:1.4:1 (mass ratio). The premixed slurry A was formed according to the method one, and the premixed slurry A was formed as follows.

Graphite and SP were added to a stirred tank and were stirred and dry mixed. CMC was dissolved in deionized water (solvent) and was dispersed at 1,800 rpm for 120 minutes to obtain CMC glue with a solid content of 1.4%. Half the mass of the prepared CMC glue, the dry mixed material, and the deionized water (solvent) were stirred and dispersed for 60 minutes. The remaining half of the CMC glue and the solvent were added, and stirring was continuously performed for 60 minutes. The plasticizer 1,3-butanediol was then added, and stirring was continuously performed for 60 minutes. Next, the SBR emulsion was added and stirred for 60 minutes. Finally, an appropriate amount of deionized water was added to adjust the viscosity to 4,000 mPa·s.

The above anode slurry was coated on a negative current collector copper foil, and the double-sided coating surface density was 150 g/m$^2$ (excluding the mass of the substrate). After the coating was completed, roll pressing and slitting were performed to obtain the anode plate.

Preparation of Cathode Plate

Cathode materials included lithium iron phosphate, SP, and polyvinylidene fluoride (PVDF), the materials were prepared according to lithium iron phosphate:SP: PVDF=97.5:1:1.5 mass ratio), and NMP was used as a solvent. The above materials were mixed with the solvent to form a cathode slurry, the solid content thereof was 60%. The cathode slurry was coated on carbon-coated aluminum foil and dried, followed by rolling and slitting to obtain the cathode plate.

Preparation of Battery

The prepared cathode plate, a ceramic separator, and the prepared anode plate were sequentially laminated to form a battery numbered A1. Then, the processes of injecting liquid, forming and fixing volume were performed to the battery.

EXAMPLE 2

The anode materials and the ratio thereof were the same as in Example 1. The premixed slurry A was formed according to the method two, and the premixed slurry A was formed as follows.

Graphite and SP were added to a stirred tank and were stirred and dry mixed. CMC and 1,3-butanediol were dissolved in deionized water and stirred to be dispersed to obtain a mixed 1,3-butanediol-CMC glue with a solid content of 1.4%. Half of the mass of the glue, the dry mixed material, and the deionized water (solvent) were stirred and dispersed for 60 minutes. The remaining half of the glue and the solvent were added, and stirring was continuously performed for 60 minutes. Next, the SBR emulsion was added, and stirring was continuously performed for 60 minutes. Finally, an appropriate amount of deionized water was added to adjust the viscosity to 4,000 mPa·s.

The anode slurry was prepared into an anode plate in the same method as in Example 1.

A cathode plate was prepared in the same method as in Example 1 and a battery numbered A2 was assembled in the same method as in Example 1. Then, the processes of injecting liquid, forming and fixing volume were performed to the battery.

EXAMPLE 3

Except that PAA was used instead of CMC, other anode materials and contents were the same as in Example 2. An anode plate and a cathode plate were formed in the same methods as in Example 2 and were assembled into a battery numbered A3. Then, the processes of injecting liquid, forming and fixing volume were performed to the battery.

EXAMPLE 4

Except that PI was used instead of CMC, other anode materials and contents were the same as in Example 2. An anode plate and a cathode plate were formed in the same methods as in Example 2 and were assembled into a battery numbered A4. Then, the processes of injecting liquid, forming and fixing volume were performed to the battery.

EXAMPLE 5

Except that PC was used instead of 1,3-butanediol, other anode materials and contents were the same as in Example 2. An anode plate and a cathode plate were formed in the same methods as in Example 2 and were assembled into a battery numbered A5. Then, the processes of injecting liquid, forming and fixing volume were performed to the battery.

EXAMPLE 6

Except that NMP was used instead of 1,3-butanediol, other anode materials and contents were the same as in Example 2. An anode plate and a cathode plate were formed in the same methods as in Example 2 and were assembled into a battery numbered A6. Then, the processes of injecting liquid, forming and fixing volume were performed to the battery.

EXAMPLE 7

The types of the anode materials were the same as in Example 1, and the materials were prepared according to graphite:SP:CMC:SBR:1,3-butanediol=94.1:0.8:1.7:1.4:2 (mass ratio).

An anode plate and a cathode plate were formed in the same methods as in Example 2 and were assembled into a battery numbered A7. Then, the processes of injecting liquid, forming and fixing volume were performed to the battery.

Comparative Example 1

The anode materials and the ratio thereof were the same as in Example 1. The process of forming an anode slurry was provided as follows.

Graphite and SP were added to a stirred tank and were stirred and dry mixed. CMC was dissolved in deionized water and was stirred to be dissolved and dispersed to obtain CMC glue with a solid content of 1.4%. The dry mixed material, half the mass of glue, and deionized water (solvent) were stirred and dispersed for 60 minutes. The remaining half of the mass of glue and the solvent were added, and stirring was continuously performed for 60 minutes. Next, the SBR emulsion was added and was continuously stirred to be dispersed. The plasticizer 1,3-butanediol was then added and was continuously stirred. Finally, an appropriate amount of solvent was added to adjust the viscosity to 4,000 mPa·s.

The anode slurry was prepared into an anode plate in the same method as in Example 1.

A cathode plate was prepared in the same method as in Example 1 and a battery numbered B1 was assembled in the same method as in Example 1. Then, the processes of injecting liquid, forming and fixing volume were performed to the battery.

Comparative Example 2

Except that PC was used instead of 1,3-butanediol, other anode materials and contents were the same as in Comparative Example 1. An anode plate and a cathode plate were formed in the same methods as in Comparative Example 1 and were assembled into a battery numbered B2. Then, the processes of injecting liquid, forming and fixing volume were performed to the battery.

Comparative Example 3

Except that NMP was used instead of 1,3-butanediol, other anode materials and contents were the same as in Comparative Example 1. The process of forming an anode slurry was provided as follows.

Graphite and SP were added to a stirred tank and were stirred and dry mixed. CMC was dissolved in deionized water and was stirred to be dissolved and dispersed to obtain CMC glue with a solid content of 1.4%. The dry mixed material, half of the glue, and deionized water (solvent) were stirred and dispersed for 60 minutes. The remaining half of the glue and the solvent were added, and stirring was continuously performed for 60 minutes. Next, the SBR emulsion and plasticizer NMP were added, and stirring was continuously performed for 60 minutes. Finally, an appropriate amount of solvent was added to adjust the viscosity to 4,000 mPa·s.

A cathode plate and an anode plate were formed in the same methods as in Comparative Example 1 and were assembled into a battery numbered B3. Then, the processes of injecting liquid, forming and fixing volume were performed to the battery.

Testing of Cycle Performance

The batteries in Examples 1-7 and Comparative Examples 1-3 were tested in an Arbin battery test cabinet at 25° C. The testing procedure is provided as follows. 1) With the battery design capacity of 5 Ah as the initial capacity, a battery was charged to 4.3V at a constant current of 1C. 2) The battery was charged at a constant voltage of 4.3V until the current was less than 0.05C. 3) The battery was allowed to stand for 5 minutes. 4) The battery was discharged to 3.0V at a constant current of 1C. After discharging was completed, the discharge capacity of the battery in the Arbin battery test cabinet was read and was treated as the discharge capacity of the battery after the charging and discharging cycle. 5) The battery was allowed to stand for 5 minutes, and the foregoing steps were repeated 200 times.

capacity retention rate after 200 cycles=(discharge capacity of the battery after the $200^{th}$ charging and discharging cycle/discharge capacity of the battery after the $1^{st}$ charging and discharging cycle)*100%

Results of cycle testing are shown in Table 1 below.

TABLE 1

| Battery Number | Plasticizer Type | Amount of Plasticizer Added (%) | Additive Type | Method of Adding SBR and Plasticizer | Capacity Retention Rate After 200 Cycles |
|---|---|---|---|---|---|
| A1 | 1,3-butanediol | 1% | CMC | method one | 94.6% |
| A2 | 1,3-butanediol | 1% | CMC | method two | 96.0% |
| A3 | 1,3-butanediol | 1% | PAA | method two | 96.8% |
| A4 | 1,3-butanediol | 1% | PEI | method two | 95.8% |
| A5 | PC | 1% | CMC | method two | 96.5% |
| A6 | NMP | 1% | CMC | method two | 96.2% |
| A7 | 1,3-butanediol | 2% | CMC | method two | 95.8% |
| B1 | 1,3-butanediol | 1% | CMC | SBR added first, plasticizer added later | 90.1% |
| B2 | PC | 1% | CMC | SBR added first, plasticizer added later | 92.9% |
| B3 | NMP | 1% | CMC | NMP and SBR added together | 93.0% |

By comparing the testing results between A1-A7 and B1-B3, it can be seen that regarding the battery prepared through the method provided by the disclosure, that is, the plasticizer and the additive are premixed first, and the SBR emulsion is added later to form the cathode slurry and to prepare the battery, the battery capacity retention rate is higher than that of a battery prepared by an anode slurry formed by adding the SBR emulsion first and adding the plasticizer later or adding the SBR emulsion and plasticizer together. It is proved that through the method provided by the disclosure, the cycle performance of the battery is improved. This is because the force formed between the plasticizer and the additive which are added first may reduce or eliminate the force of the plasticizer applied on the surfactant in the SBR emulsion, and SBR demulsification is thus prevented from occurring. In this way, the stability of the slurry may be maintained, and the battery performance may be improved.

Comparing the data of A1, A2, and A7, it can be seen that even if the mole ratio of the hydroxyl group in the plasticizer to the carboxyl group in the additive is greater than 1, the cycle performance of the battery may still be improved. This is because in the case that the mole content of the hydroxyl group in the plasticizer is greater than the content of the carboxyl group in a CMC polymer molecule, when the plasticizer and CMC are thoroughly mixed and stirred, the carboxyl groups in the CMC molecule are insufficient to allow all of the hydroxyl groups in the plasticizer to form the force, and there are still exposed hydroxyl groups in the plasticizer. These hydroxyl groups are bonded with the SBR added subsequently to cause the SBR to demulsify, so that the increase in the capacity retention rate is not high compared with A1 and A2. This also further proves that the pre-formed force between the plasticizer and additive may prevent demulsification from occurring in the SBR emulsion, and the cycle performance of the battery is thereby improved.

By comparing A1 and A2, it can be seen that the pre-mixing method adopting the method two provides a higher battery capacity retention rate than the pre-mixing method adopting the method one. The reason is that in the method two, 1,3-butanediol and CMC fully contact each other and are mixed to form the 1,3-butanediol-CMC glue. As such, the hydroxyl groups in the plasticizer are completely bonded with CMC and cannot continue to be bonded with the sulfonic acid group in SBR, so relatively stable SBR is maintained, and SBR demulsification is prevented from occurring. In the method one, the cathode active material, 1,3-butanediol, and CMC are added together. Compared with the method two, 1,3-butanediol and CMC cannot be fully bonded, and improvement on the capacity retention rate of the battery is thus affected. Combining the comparative data of A1 and B1, it can be seen that even if the improvement brought by the method one is not as good as that brought by the method two, improvement is still made.

Comparing among A3, A4, and B1, the testing results show that in addition to the carboxylic acid adhesive CMC, if the adhesive PAA containing the carboxylic acid group and the PI adhesive containing the amide group are mixed with the plasticizer in advance, the bonding between the plasticizer and sulfonic acid group in the SBR may also be reduced. In this way, degradation of electrical performance caused by SBR demulsification may be prevented.

When A5 and B2 and A6 and B3 are compared and analyzed, the testing results show that in addition to alcohol plasticizers, other plasticizers such as PC and NMP may also lead to SBR demulsification. This is because an intermolecular electrostatic force may be formed between PC esters plasticizer molecules and NMP ketone plasticizer molecules along with the sulfonic acid group. The plasticizer is mixed with the additive in advance, and by mixing the plasticizer molecules with the adhesive PAA or CMC in advance, an intermolecular dipole effect is formed as the plasticizer is bonded in advance, and demulsification caused by the plasticizer is therefore prevented from occurring in the SBR.

The foregoing disclosed preferred embodiments of the disclosure are only used to illustrate the disclosure. The preferred embodiments do not describe all details of the disclosure, and the disclosure is not limited to the specific embodiments only. Obviously, according to the contents of the specification, many modifications and changes may be made. The embodiments selected and specifically described in the specification are used to better explain the principles and practical implementations of the disclosure, so that a person of ordinary skill in the art may fully understand and make use of the disclosure. The disclosure is only limited to the claims, the complete scope, and the equivalence.

What is claimed is:

1. A preparation method of an anode slurry, comprising:
    S12, mixing materials containing a plasticizer, an additive, and a solvent to form a premixed slurry B;
    S13, mixing the materials containing the premixed slurry B, an anode active material, and a conductive agent to form a premixed slurry A; and
    S2, mixing a styrene-butadiene rubber emulsion with the premixed slurry A;
    wherein the plasticizer comprises a first functional group, the first functional group comprises at least one of a hydroxyl group, a carbonate group, and a ketone group, the additive comprises a second functional group, and the second functional group comprises at least one of a carboxyl group, a nitrile group, and an amide group.

2. The preparation method according to claim 1, wherein a mole ratio of the first functional group to the second functional group is not greater than 1.

3. The preparation method according to claim 1, wherein the additive is selected from one or more of sodium carboxymethyl cellulose, polyacrylic acid, polyimide, polyamide, polyetherimide, and polyacrylonitrile.

4. The preparation method according to claim 1, wherein the plasticizer is selected from one or more of 1,3-butanediol, dodecyl alcohol ester, triethyl citrate, tributyl citrate, ethylene carbonate, and propylene carbonate.

5. The preparation method according to claim 1, wherein the anode active material comprises one or more of natural graphite, artificial graphite, silicon carbon, silicon oxide, and lithium titanate.

* * * * *